United States Patent
König et al.

(10) Patent No.: US 9,234,098 B2
(45) Date of Patent: *Jan. 12, 2016

(54) METHOD FOR THE PRODUCTION OF COMPOSITE MATERIALS

(75) Inventors: Hannah Maria König, Mannheim (DE); Hans-Joachim Hähnle, Neustadt (DE); Arno Lange, Bad Dürkheim (DE); Samira Nozari, Mannheim (DE); Gerhard Cox, Bad Dürkheim (DE); Rainer Dyllick-Brenzinger, Neustadt (DE); Stefan Spange, Orlamünde (DE); Tina Löschner, Augustusburg (DE)

(73) Assignee: BASF SE (DE)

( * ) Notice: Subject to any disclaimer, the term of this patent is extended or adjusted under 35 U.S.C. 154(b) by 1136 days.

This patent is subject to a terminal disclaimer.

(21) Appl. No.: 13/262,755
(22) PCT Filed: Apr. 1, 2010
(86) PCT No.: PCT/EP2010/054404
§ 371 (c)(1), (2), (4) Date: Dec. 12, 2011
(87) PCT Pub. No.: WO2010/112581
PCT Pub. Date: Oct. 7, 2010

(65) Prior Publication Data
US 2012/0091400 A1    Apr. 19, 2012

(30) Foreign Application Priority Data
Apr. 3, 2009 (EP) .................... 09157335

(51) Int. Cl.
*B82Y 30/00* (2011.01)
*C08L 83/02* (2006.01)
(Continued)

(52) U.S. Cl.
CPC ............... *C08L 83/02* (2013.01); *B82Y 30/00* (2013.01); *C08J 5/005* (2013.01); *C08K 3/36* (2013.01)

(58) Field of Classification Search
CPC .......... H01B 1/04; C01B 13/00; C01B 21/06; C08L 83/06; B82Y 30/00
USPC ................ 252/506; 977/773; 423/592.1, 409; 524/588
See application file for complete search history.

(56) References Cited

U.S. PATENT DOCUMENTS
2009/0155562 A1    6/2009  Spiegelberg et al.
2010/0284882 A1*  11/2010  Koch et al. ................... 423/325
(Continued)

FOREIGN PATENT DOCUMENTS
DE    102005042138 A1     3/2007
DE    102005042138 A1 *   3/2007
(Continued)

OTHER PUBLICATIONS
Spange et al. "Nanostructured Organic-Inorganic Composite Materials by Twin Polymerization of Hybrid Monomers". Advanced Materials. Wiley InterScience. Published 2009. 6 Total Pages.*
(Continued)

*Primary Examiner* — Mark Kopec
*Assistant Examiner* — Danny N Kang
(74) *Attorney, Agent, or Firm* — Drinker Biddle & Reath LLP

(57) ABSTRACT

The present invention relates to a process for producing a nanocomposite material from
a) at least one inorganic or organometallic metal phase; and
b) an organic polymer phase;
comprising the polymerization of at least one monomer M which have
at least one first polymerizable monomer unit A which has a metal or semimetal M, and
at least one second polymerizable organic monomer unit B which is joined to the polymerizable unit A via a covalent chemical bond,
under polymerization conditions under which both the polymerizable monomer unit A and the polymerizable unit B polymerize with breakage of the bond between A and B, the monomers M to be polymerized comprising a first monomer M1 and at least one second monomer M2 which differs at least in one of the monomer units A and B from the monomer M1 (embodiment 1), or
the monomers to be polymerized comprising, as well as the at least one monomer M, at least one further monomer other than the monomers M, i.e. a conventional monomer which does not have a monomer unit A and is copolymerizable with the monomer unit B (embodiment 2).

16 Claims, 3 Drawing Sheets

Figure 1:
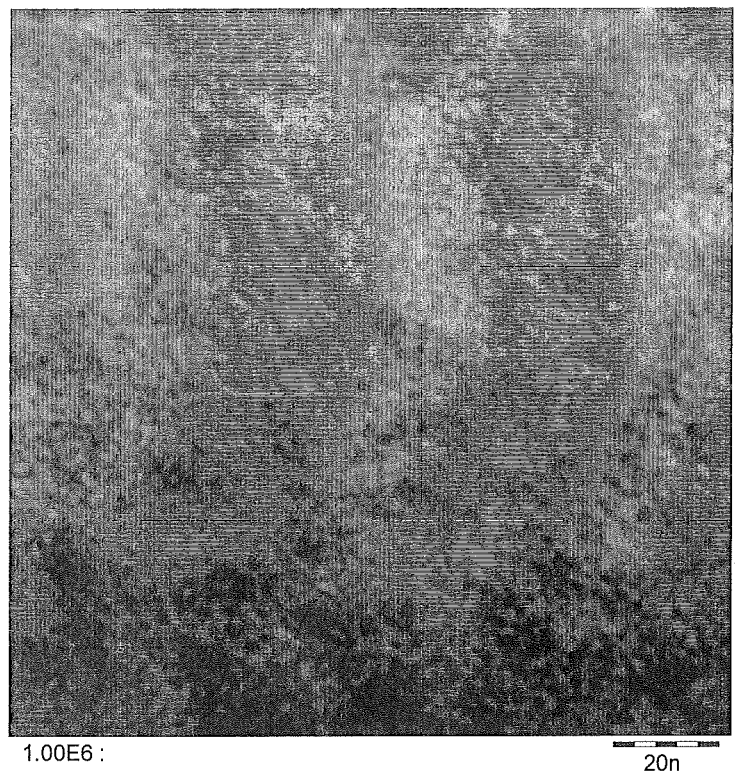

(51) Int. Cl.
*C08J 5/00* (2006.01)
*H01B 1/04* (2006.01)
*C08K 3/36* (2006.01)

(56) References Cited

U.S. PATENT DOCUMENTS

| | | |
|---|---|---|
| 2010/0294673 A1 | 11/2010 | Koch et al. |
| 2011/0046314 A1 | 2/2011 | Klipp et al. |

FOREIGN PATENT DOCUMENTS

| | | |
|---|---|---|
| DE | 102007063297 A1 | 7/2009 |
| WO | WO-01/12678 A1 | 2/2001 |
| WO | WO-2004/058859 A1 | 7/2004 |
| WO | WO-2007/028563 A1 | 3/2007 |
| WO | WO-2009/083082 A2 | 7/2009 |
| WO | WO-2009/083083 A1 | 7/2009 |
| WO | WO-2009/133082 A1 | 11/2009 |
| WO | WO-2010/112580 A1 | 10/2010 |

OTHER PUBLICATIONS

Grund et al. "Nanocomposites Prepared by Twin Polymerization of a Single-Source Monomer". Available 2007. Wiley InterScience. vol. 46, pp. 628-632. Total pp. 5.*

International Search Report for PCT/EP2010/054404, dated May 25, 2010.

Garcia, M., et al., "Large-scale extrusion processing and characterization of hybrid nylon-6/$SiO_2$ nanocomposites," Polym. Adv. Technol. (2004), vol. 15, pp. 164-172.

Grund, S., et al., "Nanocomposites Prepared by Twin Polymerization of a Single-Source Monomer," Angew. Chem. Int. Ed. (2007), vol. 46, pp. 628-632.

Grund, S., et al., "Zwillingspolymerisation: ein Weg zur Synthese von Nanokompositen," Angew. Chem. (2007), vol. 119, pp. 636-640. (Document is not in the English language but can be found in the International Search Report for PCT/EP2010/054404.).

Kuo, M.C., et al., "PEEK composites reinforced by nano-sized $SiO_2$ and $Al_2O_3$ particulates," Materials Chemistry and Physics (2005), vol. 90, pp. 185-195.

Liao, Y., "Preparation of poly(butyl methacrylate)/$\gamma Al_2O_3$ nanocomposites via ultrasonic irradiation," Polym Int (2001), vol. 50, pp. 207-212.

Maity, A., et al., "Water-Dispersible Conducting Nanocomposites of Binary Polymer Systems. I. Poly(N-vinylcarbazole)-Polyaniline-$Al_2O_3$ Nanocomposite System," Journal of Applied Polymer Science (2004), vol. 94, pp. 803-811.

Singh, R.P., et al., "Toughening of a brittle thermosetting polymer: Effects of reinforcement particle size and volume fraction," Journal of Materials Science (2002), vol. 37, pp. 781-788.

International Preliminary Report on Patentability for PCT/EP2010/054404.

* cited by examiner 1.00E6 : 1          20nm

METHOD FOR THE PRODUCTION OF COMPOSITE MATERIALS

CROSS-REFERENCE TO RELATED APPLICATIONS

This application is a national stage application (under 35 U.S.C. §371) of PCT/EP2010/054404, filed Apr. 1, 2010, which claims benefit of EP 09157335.2, filed Apr. 3, 2009.

BACKGROUND OF THE INVENTION

The present invention relates to a process for producing a nanocomposite material which is formed from
a) at least one inorganic or organometallic phase; and
b) an organic polymer phase.

Nanocomposite materials, i.e. polymer-based composite materials which comprise, in an organic polymer phase, an inorganic phase, for example an inorganic (semi)metal oxide phase with dimensions below 500 nm, especially below 100 nm (hereinafter, also nanoscale phase or, in the case of a particulate phase, nanoscale particles), owing to the large interface between the nanoscale inorganic phase and the organic polymer phase, possess a high potential with regard to their chemical, physical and mechanical properties, which cannot be achieved by milli- or microscale dispersions of conventional inorganic constituents in polymer phases (R. P. Singh, et al., *J. Mater. Sci.* 2002, 37, 781).

The processes known to date for producing inorganic-organic nanocomposites are based on direct mixing of nanoparticles or exfoliated sheet silicates with a polymer in solution or the melt, the in situ preparation of the organic phase by polymerizing organic monomers in the presence of inorganic nanoparticles or exfoliated sheet silicates, sol-gel techniques and combinations of these measures (see, for example, for incorporation of nanoparticles into a polymer melt: Garcia, M.; et al., *Polymers for Advanced Technologies* 2004, 15, 164; for polymerization of organic monomers in the presence of inorganic nanoparticles or exfoliated sheet silicates see: M. C. Kuo et al., *Materials Chemistry and Physics* 2005, 90(1), 185; A. Maity et al., *Journal of Applied Polymer Science* 2004, 94(2), 803; Y. Liao et al. (*Polymer International* 2001, 50(2), 207; and WO 2001/012678; for preparation of an oxide phase by hydrolysis of oligomeric alkoxysiloxanes in a polymer solution or melt see WO 2004/058859 and WO 2007/028563).

The established prior art methods are associated with a series of disadvantages. Firstly, many of them remain restricted to composites of organic polymers which are either soluble in organic solvents or melt without decomposition. In addition, it is generally possible in this way only to introduce small amounts of inorganic phase into the nanocomposite material. Owing to the usually high agglomeration of the nanoparticles and the enormously high shear forces which are necessary as a result, fine distribution of the nanoparticles in a relatively large amount is barely possible. A great disadvantage of nanocomposite production by in situ preparation of the organic polymer phase in the presence of nanoparticles is the formation of nanoparticle agglomerates which occurs, such that inhomogeneous products form. As a result, the advantage of the nanoparticles, that of forming extensive interfaces with the polymer as a result of their large surface area, cannot be utilized. In the case of use of pulverulent nanofillers, owing to the small particle size, there is additionally a high risk to health during compounding owing to the dust formation which occurs and the ability of the nanoparticles to reach the lungs. The in situ preparation of the inorganic phase by a sol-gel process in a polymer melt or solution generally leads to poorly reproducible results or requires complex measures to control the hydrolysis conditions.

Spange et al., *Angew. Chem. Int. Ed.,* 46 (2007) 628-632 describe a novel route to nanocomposite materials by cationic polymerization of tetrafurfuryloxysilane TFOS and difurfuryloxydimethylsilane according to the following schemes:

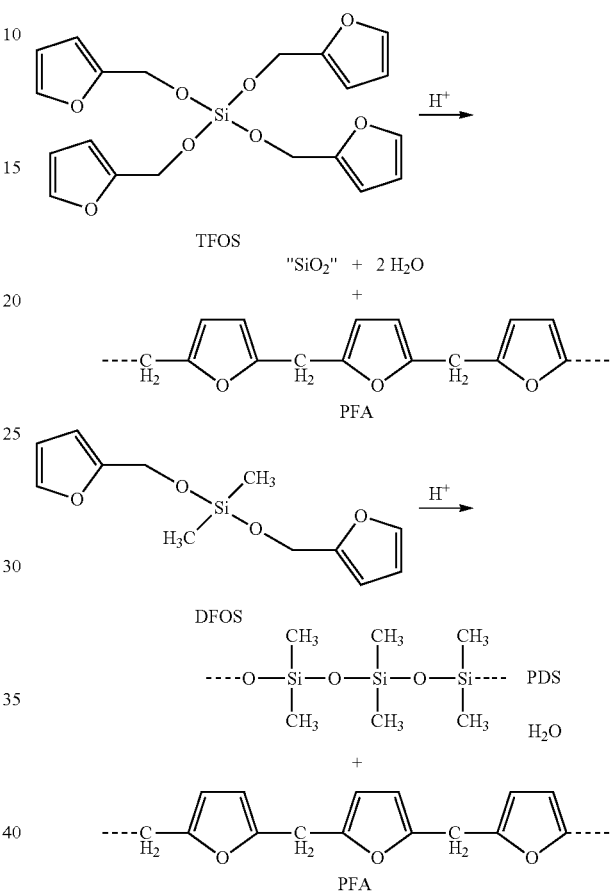

Spange et al. propose the term "twin polymerization" for this kind of polymerization.

The polymerization of TFOS under cationic conditions forms a composite material which has a silicon dioxide phase and an organic polymer phase composed of polyfurfuryl alcohol PFA. The dimensions of the phase domains in the composite material thus obtained are in the region of a few nanometers. In addition, the phase domains of the silicon dioxide phase and the phase domains of the PFA phase have a cocontinuous arrangement, i.e. both the PFA phase and the $SiO_2$ phase penetrate one another and essentially do not form any discontinuous regions. The distances between adjacent phase interfaces or the distances between the domains of adjacent identical phases are extremely small and are on average not more than 10 nm. There is no macroscopically visible separation in discontinuous domains of the particular phase.

It is assumed that the specific phase arrangement and the small distances between adjacent phases are a consequence firstly of the kinetic coupling of the polymerization of the furfuryl units, and secondly of the formation of the silicon dioxide. Consequently, the phase constituents form more or less synchronously and there is a phase separation into the inorganic phase and the organic phase as early as during the polymerization of TFOS.

In the course of polymerization of DFOS, in contrast, no formation of a composite material is observed. Instead, PFA and oligomeric dimethylsiloxane are formed, the latter separating out as an oil.

The twin polymerization described by Spange et al. solves a series of problems in the production of nanocomposite materials and especially avoids the use of nanomaterials. However, the nanocomposite materials described by Spange et al. are unsatisfactory in various aspects and have only moderate strength and are comparatively brittle.

BRIEF SUMMARY OF THE INVENTION

It has been found that twin polymerization is a novel polymerization principle which can also be applied to other monomers. In the context of this invention, a twin polymerization is understood to mean the polymerization of a monomer (known as a twin monomer) which has at least one first polymerizable monomer unit A which comprises a metal or semimetal M (in TFOS, the $SiO_4$ unit), and at least one second polymerizable organic monomer unit B (in TFOS, the furfuryl radicals) which is joined to the polymerizable unit A via a covalent chemical bond, under polymerization conditions under which both the polymerizable monomer unit A and the polymerizable unit B polymerize with breakage of the bond between A and B. Accordingly, the polymerizable units A and B are selected such that they polymerize under the same conditions.

For instance, the prior patent application PCT/EP 2008/010169 by this applicant describes a twin polymerization of optionally substituted 2,2'-spiro[4H-1,3,2-benzodioxasilin] (referred to hereinafter as SPISI) under cationic polymerization conditions to give a nanocomposite material which comprises an organic phenol-formaldehyde polymer phase and a silicon dioxide phase, and has the properties described by Spange.

It has also been found that, surprisingly, it is possible to copolymerize such twin monomers in a twin polymerization, where nanocomposite material with an arrangement of the phase domains similar to that in nanocomposite materials obtainable by homopolymerizing SPIS or TFOS. It is already surprising that, even in a mixture of twin monomers, virtually complete polymerization takes place, since it would be expected that the kinetically demanding mechanisms of the individual monomers influence one another and lead to premature stoppage or lack of polymerization. Furthermore, the phase domains here too have a co-continuous arrangement and dimensions in the region of a few nanometers (distance between adjacent identical phases). This is surprising because it had to be assumed that the arrangement of the phase domains in the composite materials obtained by homopolymerization of TFOS or SPISI is based on the kinetic coupling of the polymerization of the organic molecular moiety and of the inorganic component. Since there is no such coupling between the comonomers, it would have been expected that a very much more marked separation of the phase domains occurs in the copolymerization of twin monomers and a homogeneous composite material cannot be obtained.

The phase separation is surprisingly also maintained when a twin monomer is copolymerized with a conventional monomer, i.e. a monomer which does not have a monomer unit A, when the conventional monomer is copolymerizable with monomer unit B of the twin monomer.

Accordingly, the present invention relates to a process for producing a nanocomposite material from a) at least one inorganic or organometallic metal phase; and
b) an organic polymer phase;

comprising the polymerization of at least one monomer which has at least one first polymerizable monomer unit A which comprises a metal or semimetal M, and at least one second polymerizable organic monomer unit B which is joined to the polymerizable unit A via a covalent chemical bond, (twin monomer)

under polymerization conditions under which both the polymerizable monomer unit A and the polymerizable unit B polymerize with breakage of the bond between A and B, the monomers to be polymerized comprising a first twin monomer M1 and at least one second twin monomer M2 which differs at least in one of the monomer units A and B from the monomer M1 (embodiment 1), or the monomers to be polymerized comprising, as well as the at least one twin monomer, at least one further monomer M' other than the twin monomers, i.e. a conventional monomer which does not have a monomer unit A and is copolymerizable with the monomer unit B of the twin monomer (embodiment 2).

DETAILED DESCRIPTION OF THE INVENTION

The process according to the invention is associated with a series of advantages. Firstly, the process according to the invention, through selection of suitable comonomers, allows the controlled modification of the material properties of the composite material obtainable thereby. For example, the properties of the inorganic polymer phase can be modified by copolymerizing twin monomers, which differ in the type of copolymerizable A unit, with one another. In an analogous manner, it is possible, for example, to modify the properties of the organic polymer phase by copolymerizing twin monomers, which differ in the type of copolymerizable B unit, with one another. Moreover, the organic polymer phase can be modified by copolymerizing a conventional comonomer. In this way, it is possible to achieve, for example, crosslinking of the polymer phase. It is equally possible, for example, to modify the properties of the organic and inorganic polymer phases by copolymerizing twin monomers, which differ both in the type of the polymerizable A unit and in the type of the polymerizable B unit, with one another.

Surprisingly, such a modification does not lead to destruction of the domain arrangement. In addition, the composite materials obtainable in accordance with the invention are notable for advantageous mechanical properties, especially relatively low brittleness and relatively high toughness or elasticity and/or for relatively high strengths.

Accordingly, the present invention also relates to the nanocomposite material obtainable by the process according to the invention.

The process according to the invention is especially suitable for twin polymerization of those monomers in which the monomer unit A comprises a metal or semimetal which is selected from the metals and semimetals of main group 3 (IUPAC group 3), especially B or Al, metals and semimetals of main group 4 of the periodic table (IUPAC group 14), especially Si, Ge, Sn or Pb, semimetals of main group 5 of the periodic table (IUPAC group 15), especially As, Sb and Bi, metals of transition group 4 of the periodic table, especially Ti, Zr and Hf, and metals of transition group 5 of the periodic table, such as V. The process according to the invention is suitable especially for twin polymerization of those monomers in which the monomer unit A comprises a metal or semimetal which is selected from the metals and semimetals of main group 4 of the periodic table, especially Si, Ge, Sn or Pb, and metals of transition group 4 of the periodic table, especially Ti, Zr and Hf. The process according to the invention is more preferably suitable for twin polymerization of those monomers in which the monomer unit A in at least one of the monomers comprises a metal or semimetal selected from Si and Ti. The process according to the invention is most preferably suitable for twin polymerization of those monomers in which, at least in a portion or the entirety of the monomers, the monomer unit A comprises essentially exclusively silicon. In a very particularly preferred embodiment, at least 90 mol % and especially the entirety of the metals or semimetals present in the twin monomers are silicon. In a likewise very particularly preferred embodiment, at least 90 mol % and especially the entirety of the metals or semimetals present in the twin monomers are boron. In a likewise particularly preferred embodiment, at last 90 mol % and especially the entirety of the metals or semimetals present in the twin monomers are selected from combinations of silicon with at least one further metal atom, especially titanium or tin, especially titanium. In this case, the molar ratio of silicon to the further metal atom is preferably in the range from 10:1 to 1:10 and especially in the range from 1:5 to 5:1.

In inventive embodiment 1, the monomers M to be polymerized comprise a first monomer M1 and at least one second monomer M2 which differs at least in one of the monomer units A and B from the monomer M1.

In a preferred configuration of embodiment 1, the monomers M1 and M2 differ in the type of monomer unit A.

Such a difference may be the type of metal or semimetal in the monomer unit A: for example, twin monomers in which one monomer (monomer M1) comprises silicon as the semimetal and the second monomer M2 comprises a metal or semimetal selected from a metal or semimetal other than silicon, for example a metal of transition group 4 of the periodic table, such as Ti, Zr or Hf, especially Ti, can be copolymerized with one another. It is likewise possible to copolymerize twin monomers in which one monomer (monomer M1) comprises silicon as the semimetal and the second monomer M2 comprises a metal or semimetal selected from a metal or semimetal of main group 3 of the Periodic Table, for example boron or aluminum, especially boron. It is likewise possible to copolymerize twin monomers in which one monomer (monomer M1) comprises silicon as the semimetal and the second monomer M2 comprises a metal or semimetal selected from a metal or semimetal of main group 4 of the Periodic Table other than silicon, for example tin or germanium, especially tin.

Such a difference may also be the type of the ligand(s) of the metal or semimetal in the twin monomers which is not involved in the polymerization of the organic phase. When, for example, the metal or semimetal, especially silicon, in the monomer unit A of the monomer M2 has inorganic or organic ligands which are inert under polymerization conditions and are not eliminated under polymerization conditions, for example by means of carbon- or nitrogen-bonded inert hydrocarbon radicals such as alkyl, cycloalkyl or optionally substituted phenyl, these inert radicals become part of the inorganic or organometallic phase. In the case of copolymerization of such a monomer M2 with a monomer M1 which bears no such ligands on the (semi)metal atom of the monomer unit A, but instead bears exclusively ligands which form the polymerizable unit B and which are preferably bonded via oxygen, the result is generally an inorganic mixed phase or a mixture of two inorganic or organometallic phases with typically oxidic (or nitridic or sulfidic) constituents which result from the monomer M1, and oxidic, sulfidic, nitridic or organometallic constituents which result from the monomer M2. When, for example, the (semi)metal atom in the monomer M1 is silicon or titanium which has exclusively oxygen-bonded B groups and the (semi)metal atom in the monomer M2 is silicon which, as well as the B groups which are preferably bonded via oxygen, also bears inert carbon-bonded ligands, the polymerization forms not only silicon dioxide or titanium dioxide but also polysiloxanes or a silicon dioxide or titanium dioxide modified with siloxane units.

In a further preferred configuration of embodiment 1, the monomers M1 and M2 differ in the type of monomer unit B. In this way, composite materials modified with regard to the organic polymer phase are obtained. When, for example, the monomers M1 and M2 each have monomer units B1 and B2 respectively, which are copolymerizable with one another, the twin polymerization forms a copolymer formed from the monomer units B1 and B2. When the monomer units B1 and B2 are not copolymerizable with one another, the twin copolymerization forms, in the organic polymer phase, a blend of two different polymers in a very intimate mixture with one another, one polymer being formed essentially from the monomer units B1 and the other polymer essentially from the monomer units B2.

In embodiment 1, the molar ratio of monomer M1 to the at least one further monomer M2 is generally in the range from 5:95 to 95:5, preferably in the range from 10:90 to 90:10, in particular in the range from 15:85 to 85:15 and especially in the range from 20:80 to 80:20.

In inventive embodiment 2, the monomers to be polymerized comprise, as well as the at least one twin monomer, at least one further monomer M' (comonomer M') other than the twin monomers, i.e. a conventional monomer which does not have a monomer unit A and is copolymerizable with the monomer unit B. In this way, the twin polymerization forms a copolymer formed from the monomer units B and the comonomer M'. Such a comonomer may, for example, be formaldehyde or a formaldehyde precursor such as paraformaldehyde, dimethoxymethane or trioxane, especially when the monomer unit B is an optionally substituted benzyl, furfuryl or thienylmethyl unit.

Compounds suitable as twin monomers are known from the prior art or can be prepared in an analogous manner to the methods described therein. Reference may be made here, for example, to the literature cited at the outset and to:

Silyl enol ethers (Chem. Ber. 119, 3394 (1986); J. Organomet. Chem. 244 381 (1981); JACS 112, 6965 (1990))

Cycloboroxanes (Bull. Chem. Soc. Jap. 51, 524 (1978); Can. J. Chem. 67, 1384 (1989); J. Organomet. Chem. 590, 52 (1999))

Cyclosilicates and -germanates (Chemistry of Heterocyclic Compounds, 42, 1518, (2006); Eur. J. Inorg. Chem. (2002), 1025; J. Organomet. Chem. 1, 93 (1963); J. Organomet. Chem. 212, 301 (1981); J. Org. Chem. 34, 2496 (1968); Tetrahedron 57, 3997 (2001) and prior international applications WO 2009/083082 and WO2009/083083)

Cyclostannanes (J. Organomet. Chem. 1, 328 (1963))

Cyclozirconates (JACS 82, 3495 (1960)).

Preferred twin monomers as used in the twin polymerization can be described by the general formula I:

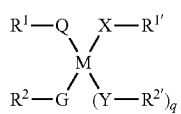
(I)

in which

M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, even more preferably Si or Ti and especially Si;

$R^1$, $R^2$ may be the same or different and are each an Ar—C($R^a$,$R^b$)— radical in which Ar is an aromatic or heteroaromatic ring which optionally has 1 or 2 substituents selected from halogen, CN, $C_1$-$C_6$-alkyl, $C_1$-$C_6$-alkoxy and phenyl, and $R^a$, $R^b$ are each independently hydrogen or methyl or together are an oxygen atom or a methylidene group (=$CH_2$) and in particular are both hydrogen, or the $R^1Q$ and $R^2G$ radicals together are a radical of the formula A

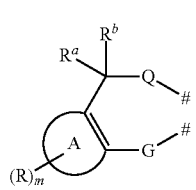
(A)

in which A is an aromatic or heteroaromatic ring fused to the double bond, m is 0, 1 or 2, the R radicals may be the same or different and are selected from halogen, CN, $C_1$-$C_5$-alkyl, $C_1$-$C_6$-alkoxy and phenyl, and $R^a$, $R^b$ are each as defined above;

G is O, S or NH and especially O;

Q is O, S or NH and especially O;

q according to the valency or charge of M is 0, 1 or 2 and especially 1,

X, Y may be the same or different and are each O, S, NH or a chemical bond and especially oxygen or a chemical bond;

$R^{1'}$, $R^{2'}$ may be the same or different and are each $C_1$-$C_6$-alkyl, $C_3$-$C_6$-cycloalkyl, aryl or an Ar'-C($R^{a'}$,$R^{b'}$)— radical in which Ar' is as defined for Ar and $R^{a'}$, $R^{b'}$ are each as defined for $R^a$, $R^b$ and in particular are hydrogen, or $R^{1'}$, $R^{2'}$ together with X and Y are a radical of the formula A, as defined above.

Also suitable for the twin copolymerization are monomers of the formula I in which M, $R^1$, $R^2$, G, Q, q, Y and $R^{2'}$ are each as defined above, in which the $R^{1'}$ radical is a radical of the formula:

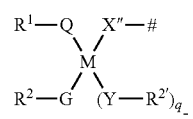

in which q, $R^1$, $R^2$, $R^{2'}$, Y, r Q and G are each as defined above, X" is as defined for Q and is especially oxygen, and # means the bonds to M. Among these, preference is given to those monomers in which M, $R^1$, $R^2$, G, Q, q, Y and $R^{2'}$ have the definitions specified as preferred, especially those in which the $R^1Q$ and $R^2G$ radicals together are a radical of the formula A.

Also suitable for the twin copolymerization are monomers which derive from the monomers of the formula I in which M is Ti or Zr, q=1 and Q and G are each oxygen, specifically such that these monomers are p-oxido-bridged oligomers, e.g. tetramers.

In the monomers of the formula I, the molecular moieties corresponding to the $R^1$ and $R^2G$ radicals constitute polymerizable B unit(s). When X and Y are not a chemical bond and $R^{1'}X$ and $R^{2'}$ are not inert radicals such as $C_1$-$C_6$-alkyl, $C_3$-$C_6$-cycloalkyl or aryl, the $R^{1'}X$ and $R^{2'}Y$ radicals likewise constitute polymerizable B unit(s). In contrast, the metal atom M, optionally together with the Q and Y groups, forms the main constituent of the monomer unit A.

In the context of the invention, an aromatic radical or aryl is understood to mean a carbocyclic aromatic hydrocarbon radical such as phenyl or naphthyl.

In the context of the invention, a heteroaromatic radical or hetaryl is understood to mean a heterocyclic aromatic radical which generally has 5 or 6 ring members, where one of the ring members is a heteroatom selected from nitrogen, oxygen and sulfur, and 1 or 2 further ring members may optionally be a nitrogen atom and the remaining ring members are carbon. Examples of heteroaromatic radicals are furyl, thienyl, pyrrolyl, pyrazolyl, imidazolyl, oxazolyl, isoxazolyl, pyridyl or thiazolyl.

In the context of the invention, a fused aromatic radical or ring is understood to mean a carbocyclic aromatic divalent hydrocarbon radical such as o-phenylene (benzo) or 1,2-naphthylene (naphtho).

In the context of the invention, a fused heteroaromatic radical or ring is understood to mean a heterocyclic aromatic radical as defined above, in which two adjacent carbon atoms form the double bond shown formula A or in the formulae II and III.

In a first embodiment of the monomers of the formula I, the $R^1Q$ and $R^2G$ groups together are a radical of the formula A as defined above, especially a radical of the formula Aa:

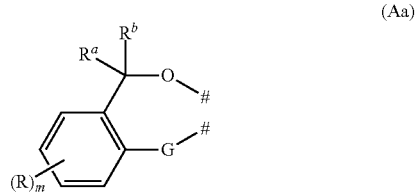
(Aa)

in which #, m, R, $R^a$ and $R^b$ are each as defined above. In the formulae A and Aa, the variable m is especially 0. When m is 1 or 2, R is especially a methyl or methoxy group. In the formulae A and Aa, $R^a$ and $R^b$ are especially each hydrogen. In formula A, Q is especially oxygen. In the formulae A and Aa, G is especially oxygen or NH, especially oxygen.

Among the twin monomers of the first embodiment, preference is given especially to those monomers of the formula I in which q=1 and in which the X—$R^{1'}$ and Y—$R^{2'}$ groups together are a radical of the formula A, especially a radical of the formula Aa. Such monomers can be described by the following formulae II and IIa:

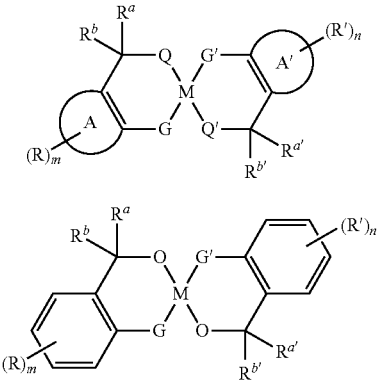
(II)

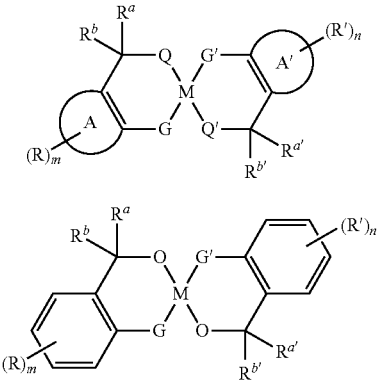
(IIa)

Among the twin monomers of the first embodiment, preference is further given to those monomers of the formula I in which q is 0 or 1 and in which the X—R$^{1'}$ group is a radical of the formula A' or Aa':

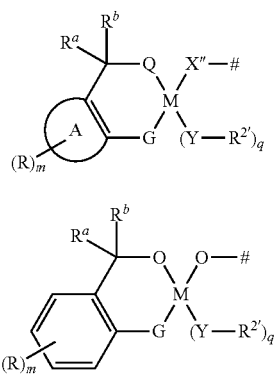
(A')

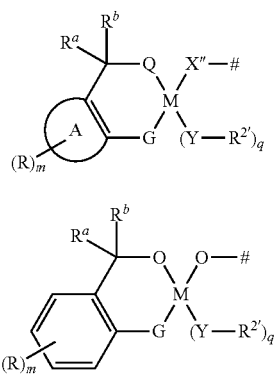
(A')

in which m, A, R, R$^a$, R$^b$, G, Q, X", Y, R$^{2'}$ and q are each as defined above, and especially have the definitions specified as preferred.

Such monomers can be described by the following formulae II' or IIa':

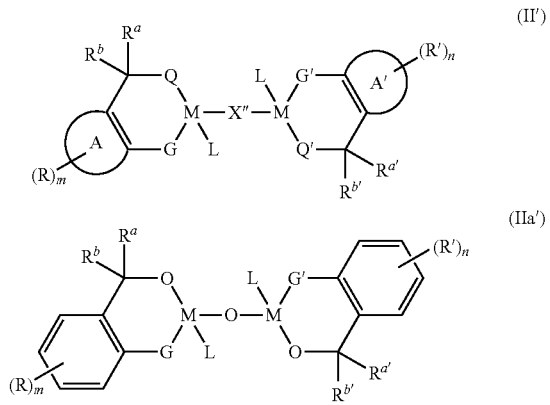
(II')

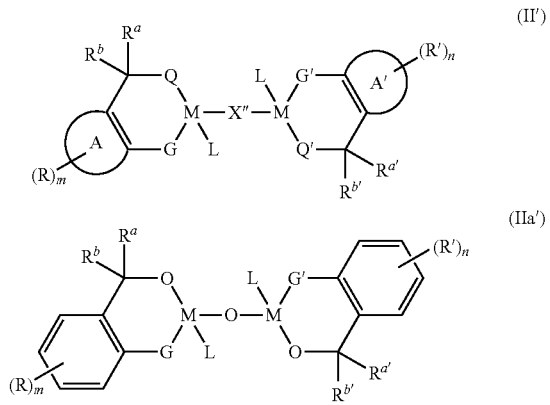
(IIa')

In the formulae II and II', the variables are each defined as follows:

M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;

A, A' are each independently an aromatic or heteroaromatic ring fused to the double bond;

m, n are each independently 0, 1 or 2, especially 0;

G, G' are each independently O, S or NH, in particular O or NH and especially O;

Q, Q' are each independently O, S or NH, in particular O;

R, R' are each independently selected from halogen, CN, $C_1$-$C_6$-alkyl, $C_1$-$C_6$-alkoxy and phenyl, and are especially each methyl or methoxy;

R$^a$, R$^b$, R$^{a'}$, R$^{b'}$ are each independently selected from hydrogen and methyl, or R$^a$ and R$^b$ and/or R$^{a'}$ and R$^{b'}$ in each case together are an oxygen atom or =CH$_2$; in particular, R$^a$, R$^b$, R$^{a'}$, R$^{b'}$ are each hydrogen, L is a (Y—R$^{2'}$)$_q$ group in which Y, R$^{2'}$ and q are each as defined above and X" has one of the definitions specified for Q and is especially oxygen.

In the formulae IIa and IIa', the variables are each defined as follows:

M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;

m, n are each independently 0, 1 or 2, especially 0;

G, G' are each independently O, S or NH, in particular O or NH and especially O;

R, R' are each independently selected from halogen, CN, $C_1$-$C_6$-alkyl, $C_1$-$C_6$-alkoxy and phenyl, and are especially each methyl or methoxy;

R$^a$, R$^b$, R$^{a'}$, R$^{b'}$ are each independently selected from hydrogen and methyl, or R$^a$ and R$^b$ and/or R$^{a'}$ and R$^{b'}$ in each case together are an oxygen atom or =CH$_2$; in particular, R$^{a'}$, R$^b$, R$^{a'}$, R$^{b'}$ are each hydrogen, L is a (Y—R$^{2'}$)$_q$ group in which Y, R$^{2'}$ and q are each as defined above.

One example of a monomer of the formula II or IIa is 2,2'-spirobis[4H-1,3,2-benzodioxasilin] (compound of the formula IIa where M=Si, m=n=0, G=O, R$^a$=R$^b$=R$^{a'}$=R$^{b'}$=hydrogen). Such monomers are known from prior international patent application WO2009/083082 and PCT/EP 2008/010169 [WO2009/083083] or can be prepared by the methods described there. A further example of a monomer IIa is 2,2-spirobi[4H-1,3,2-benzodioxaborin] (Bull. Chem. Soc. Jap. 51 (1978) 524): (compound of the formula IIa where M=B, m=n=0, G=O, R$^a$=R$^b$=R$^{a'}$=R$^{b'}$=hydrogen). A further example of a monomer IIa' is bis(4H-1,3,2-benzodioxaborin-2-yl)oxide (compound of the formula IIa' where M=B, m=n=0, L absent (q=0), G=O, R$^a$=R$^b$=R$^{a'}$=R$^{b'}$=hydrogen; Bull. Chem. Soc. Jap. 51 (1978) 524).

In the monomers II and IIa, the MQQ' or MO$_2$ unit constitutes the polymerizable A unit, whereas the remaining parts of the monomer II or IIa, i.e. the groups of the formula A or Aa, minus the Q or Q' atoms (or minus the oxygen atom in Aa) constitute the polymerizable B units.

In a preferred embodiment 1a, a mixture of two or more monomers M1 and M2 is copolymerized, the monomer M1 being a monomer of the formula II or IIa and the further monomer M2 likewise being selected from the monomers of the formulae II and IIa, the monomer M1 differing from the monomer M2 in the type of polymerizable A unit, i.e. the (semi)metal atom M. More particularly, the (semi)metal atom M in monomer M1 is silicon, and that in monomer M2 is a (semi)metal atom other than silicon, in particular B, Ti, Zr, Hf or Sn and especially Ti or B.

In a further preferred embodiment 1b, a mixture of two or more monomers M1 and M2 is copolymerized, the monomer M1 being a monomer of the formula II or IIa and the further monomer M2 being selected from the monomers of the formulae III and IIIa defined below. Here too, the monomer M1 differs from the monomer M2 in the type of polymerizable A unit, specifically in that the monomer M2 has ligands which can remain on the metal under polymerization conditions. More particularly, the (semi)metal atom M in the monomer M1 is silicon, boron or titanium, and that in the monomer M2 is silicon. Likewise preferably, the (semi)metal atom M in the monomer M1 is then silicon, boron or titanium, and in the monomer M2 is silicon, boron or tin.

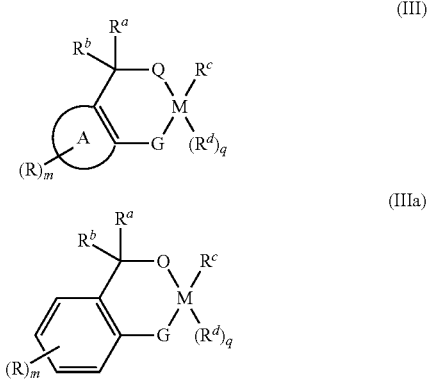

In formula III, the variables are each defined as follows:
M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;
A is an aromatic or heteroaromatic ring fused to the double bond;
m is 0, 1 or 2, especially 0;
q according to the valency and charge of M is 0, 1 or 2;
G is O, S or NH, in particular O or NH and especially O;
Q is O, S or NH, in particular O;
R are each independently selected from halogen, CN, $C_1$-$C_6$-alkyl, $C_1$-$C_6$-alkoxy and phenyl, and are especially methyl or methoxy;
$R^a$, $R^b$ are each independently selected from hydrogen and methyl, or $R^a$ and $R^b$ together are an oxygen atom or =$CH_2$, and are especially both hydrogen;
$R^c$, $R^d$ are the same or different and are selected from $C_1$-$C_6$-alkyl, $C_3$-$C_6$-cycloalkyl and aryl, and are especially each methyl.

In formula IIIa, the variables are each defined as follows:
M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;
m is 0, 1 or 2, especially 0;
G is O, S or NH, in particular O or NH and especially O;
R are each independently selected from halogen, CN, $C_1$-$C_6$-alkyl, $C_1$-$C_6$-alkoxy and phenyl, and are especially methyl or methoxy;
$R^a$, $R^b$ are each independently selected from hydrogen and methyl, or $R^a$ and $R^b$ together are an oxygen atom or =$CH_2$, and are especially both hydrogen;
$R^c$, $R^d$ are the same or different and are each selected from $C_1$-$C_6$-alkyl, $C_3$-$C_6$-cycloalkyl and aryl, and are especially each methyl.

Examples of monomers of the formula III or IIIa are 2,2-dimethyl-4H-1,3,2-benzodioxasilin (compound of the formula IIIa where M=Si, q=1, m=0, G=O, $R^a$=$R^b$=hydrogen, $R^b$=$R^d$=methyl), 2,2-dimethyl-4H-1,3,2-benzooxazasilin, (compound of the formula IIIa where M=Si, q=1, m=0, G=NH, $R^a$=$R^b$=hydrogen, $R^c$=$R^d$=methyl), 2,2-dimethyl-4-oxo-1,3,2-benzodioxasilin (compound of the formula IIIa where M=Si, q=1, m=0, G=O, $R^a$+$R^b$=O, $R^c$=$R^d$=methyl) and 2,2-dimethyl-4-oxo-1,3,2-benzooxazasilin (compound of the formula IIIa where M=Si, q=1, m=0, G=NH, $R^a$+$R^b$=O, $R^c$=$R^d$=methyl). Such monomers are known, for example, from Wieber et al. Journal of Organometallic Chemistry; 1, 1963, 93, 94. Further examples of monomers IIIa are 2,2-diphenyl[4H-1,3,2-benzodioxasilin] (J. Organomet. Chem. 71 (1974) 225); 2,2-di-n-butyl[4H-1,3,2-benzodioxastannin] (Bull. Soc. Chim. Belg. 97 (1988) 873); 2,2-dimethyl[4-methylidene-1,3,2-benzodioxasilin] (J. Organomet. Chem., 244, $C_5$-$C_8$ (1983)); 2-methyl-2-vinyl[4-oxo-1,3,2-benzodioxazasilin].

In a further preferred embodiment 1c, a mixture of two or more monomers M1 and M2 is copolymerized, the monomer M1 being a monomer of the formula II or IIa and the further monomer M2 being selected from the monomers of the formula IV, V, Va, VI or VIa defined below. Here, the monomer M1 differs from the monomer M2 in the type of polymerizable B unit and optionally in the type of polymerizable A unit, specifically in the case of the monomers VI and VIa or when the monomers IV; V or VIa have a (semi)metal atom M other than the (semi)metal atom M of the monomer M1.

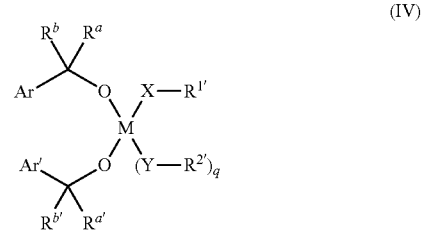

In formula IV, the variables are each defined as follows:
M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably Si, Ti, Zr or Sn, especially Si;
Ar, Ar' are the same or different and are each an aromatic or heteroaromatic ring, especially 2-furyl or phenyl, where the aromatic or heteroaromatic ring optionally has 1 or 2 substituents selected from halogen, CN, $C_1$-$C_6$-alkyl, $C_1$-$C_6$-alkoxy and phenyl;
$R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom; $R^a$, $R^b$, $R^{a'}$, $R^{b'}$ are especially each hydrogen;
q according to the valency of M is 0, 1 or 2 and especially 1;
X, Y are the same or different and are each O, S, NH or a chemical bond; and
$R^{1'}$, $R^{2'}$ are the same or different and are each $C_1$-$C_6$-alkyl, $C_3$-$C_6$-cycloalkyl, aryl or an Ar"—$C(R^{a''},R^{b''})$— radical in which Ar" is as defined for Ar and R', and $R^{a''}$, $R^{b''}$ are each as defined for $R^a$, $R^b$ or for $R^{a'}$, $R^{b'}$, or $R^{1'}$, $R^{2'}$ together with X and Y are a radical of the formula A, especially a radical of the formula Aa, as defined above.

Among the monomers of the formula IV, preference is given especially to those monomers in which q=0, 1 or 2, especially q=1, and the X—$R^1$ and Y—$R^{2'}$ groups are the same or different and are each an Ar"—$C(R^{a''},R^{b''})O$ group, and are preferably each an Ar"—$CH_2O$ group ($R^a$=$R^b$=hydrogen), where Ar" is as defined above and is especially selected from furyl, thienyl, pyrrolyl and phenyl, where the four rings mentioned are unsubstituted or have one or two substituents selected from halogen, CN, $C_1$-$C_6$-alkyl, $C_1$-$C_6$-alkoxy and phenyl. Such monomers can be described by the following formulae V and Va:

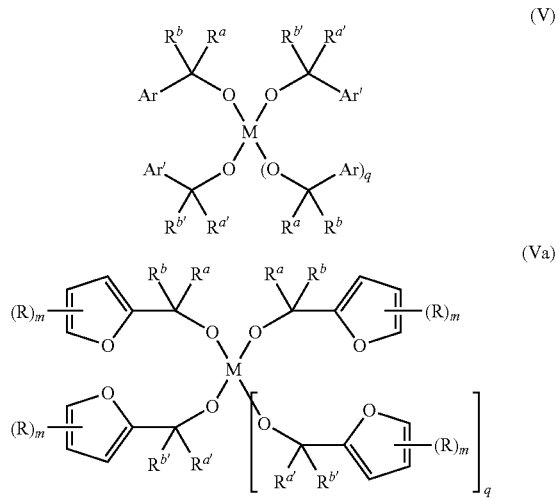

In the formulae V and Va, the variables are each defined as follows:

M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;

Ar, Ar' in formula V are the same or different and are each an aromatic or heteroaromatic ring, especially 2-furyl or phenyl, where the aromatic or heteroaromatic ring optionally has 1 or 2 substituents selected from halogen, CN, $C_1$-$C_6$-alkyl, $C_1$-$C_6$-alkoxy and phenyl;

$R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom; $R^a$, $R^b$, $R^{a'}$, $R^{b'}$ are especially each hydrogen;

q according to the valency of M is 0, 1 or 2 and especially 1.

In formula Va, m is 0, 1 or 2 and especially 0, and R is selected from halogen, CN, $C_1$-$C_6$-alkyl, $C_1$-$C_6$-alkoxy and phenyl, and especially from methyl and methoxy.

One example of a monomer of the formula V or Va is tetrafurfuryloxysilane (compound of the formula Va where M=Si, q=1, m=0, $R^a$=$R^b$=hydrogen): Angew. Chem. Int. Ed., 46 (2007) 628. A further example of the monomer V or Va is tetrafurfuryl orthotitanate: Adv. Mater. 2008, 20, 4113. This compound tetramerizes to ($\mu^4$-oxido)-hexakis(m-furfuryloxo)-octakis(furfuryloxo)tetratitanium, which is used as a twin monomer. A further example of the monomer V or Va is trifurfuryloxyborane.

Among the monomers of the formula IV, preference is also given to those monomers in which the X—$R^{1'}$ and Y—$R^{2'}$ groups are the same or different and are each selected from $C_1$-$C_6$-alkyl, $C_3$-$C_6$-cycloalkyl and aryl, for example phenyl, i.e. X and Y are each a chemical bond. Such monomers can be described by the following formulae VI and VIa:

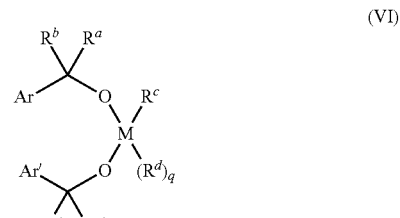

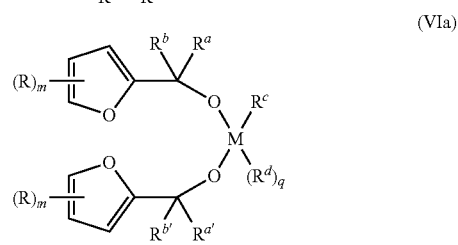

In the formulae VI and VIa, the variables are each defined as follows:

M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;

Ar, Ar' in formula VI are the same or different and are each an aromatic or heteroaromatic ring, especially 2-furyl or phenyl, where the aromatic or heteroaromatic ring optionally has 1 or 2 substituents selected from halogen, CN, $C_1$-$C_6$-alkyl, $C_1$-$C_6$-alkoxy and phenyl;

$R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom; $R^a$, $R^b$, $R^{a'}$, $R^{b'}$ are especially each hydrogen;

q according to the valency of M is 0, 1 or 2 and especially 1;

$R^c$, $R^d$ are the same or different and are each selected from $C_1$-$C_6$-alkyl, $C_3$-$C_6$-cycloalkyl and aryl, and are especially each methyl.

In formula VIa, m is 0, 1 or 2 and is especially 0, and R is selected from halogen, CN, $C_1$-$C_6$-alkyl, $C_1$-$C_6$-alkoxy and phenyl and especially from methyl and methoxy.

One example of a monomer of the formula VI or VIa is bis(furfuryloxy)dimethylsilane (compound of the formula VIa where M=Si, q=1, m=0, $R^a$=$R^b$=hydrogen, $R^c$=$R^d$=methyl).

Such monomers of the formulae IV, V, Va, VI and VIa are known from the prior art, for example from the article by Spange et al. cited at the outset and the literature cited therein, or can be prepared in an analogous manner.

In a further preferred embodiment 1d, the monomers M to be polymerized comprise at least one monomer of the general formula IV, especially at least one monomer of the general formula V, and especially at least one monomer of the general formula Va, as defined above.

In a preferred embodiment 1e, a mixture of two or more monomers M1 and M2 is copolymerized, the monomer M1 being a monomer of the formula V or Va and the further monomer M2 likewise being selected from the monomers of the formulae V and Va, the monomer M1 differing from the monomer M2 in the type of polymerizable A unit, i.e. the (semi)metal atom M. More particularly, the (semi)metal atom M in the monomer M1 is silicon, and that in the monomer M2 is a (semi)metal atom other than silicon, in particular Ti, Zr, Hf or Sn and especially Ti.

In a further preferred embodiment 1f, a mixture of two or more monomers M1 and M2 is copolymerized, the monomer M1 being a monomer of the formula V or Va and the further monomer M2 being selected from the monomers of the above-defined formulae VI and VIa. Here too, the monomer M1 differs from the monomer M2 in the type of polymerizable A unit, specifically in that the monomer M2 has ligands which can remain on the metal under polymerization conditions. More particularly, the (semi)metal atom M in the monomer M1 is silicon or titanium, and that in the monomer M2 is silicon.

In a preferred configuration of inventive embodiment 2, the monomers to be polymerized comprise at least one monomer M which is selected from the monomers of the formula I and at least one further monomer M' (comonomer M') which is different than the monomers of the formula I and is copolymerizable with the monomer unit B in formula I. Such a comonomer may, for example, be formaldehyde or a formaldehyde precursor such as paraformaldehyde or trioxane.

In a particularly preferred configuration of inventive embodiment 2, the monomers to be polymerized comprise at least one monomer M which is selected from the monomers of the formula II and especially from the monomers of the formula IIa, and at least one further, conventional monomer M' (comonomer M') which is different than the monomers of the formula II or IIa and is copolymerizable with the monomer unit B in formula II or IIa. Such a comonomer may, for example, be formaldehyde or a formaldehyde precursor such as paraformaldehyde or trioxane.

In a further particularly preferred configuration of inventive embodiment 2, the monomers to be polymerized comprise at least one monomer M which is selected from the monomers of the formula V and especially from the monomers of the formula Va and at least one further, conventional monomer M' (comonomer M') which is different than the monomers of the formula V or Va and is copolymerizable with the monomer unit B in formula II or IIa. Such a comonomer may, for example, be formaldehyde or a formaldehyde precursor such as paraformaldehyde or trioxane.

In a further embodiment of the invention, the twin monomers are selected from aromatic compounds which have an average of at least two trialkylsilyloxymethyl groups and/or aryldialkylsilyloxymethyl groups bonded to identical or different aryl groups, especially to phenyl rings. Alkyl in this context is alkyl having 1 to 4 carbon atoms, especially methyl or ethyl. Aryl in this context is phenyl or naphthyl, especially phenyl. One example of a trialkylsilyloxymethyl group is trimethylsilyloxymethyl $((H_3C)_3Si-O-CH_2-)$. One example of an aryldialkylsilyloxymethyl group is dimethylphenylsilyloxymethyl$(phenyl(H_3C)_2Si-O-CH_2-)$. In this case, the aryl ring to which the trialkylsilyloxymethyl groups and/or aryldialkylsilyloxymethyl groups are bonded may have further substituents, for example $C_1$-$C_4$-alkoxy such as methoxy, $C_1$-$C_4$-alkyl, trialkylsilyloxy or aryldialkylsilyloxy. More particularly, such twin monomers are phenolic compounds which have at least two trialkylsilyloxymethyl groups and/or aryldialkylsilyloxymethyl groups bonded to phenyl rings of the phenolic compound, where the OH groups of the phenolic compounds may be etherified, especially with trialkylsilyl groups and/or aryldialkylsilyl groups. Such compounds can be prepared by hydroxymethylation of aromatic compounds, especially of phenolic compounds, and subsequent reaction with trialkylhalosilanes or with aryldialkylhalosilanes, and in the case of phenolic starting materials not only the hydroxymethyl groups but also the phenolic OH groups are converted to the corresponding silyl ethers. Examples of aromatic compounds are especially phenolic compounds such as phenol, cresols and bisphenol A (=2,2-bis-(4-hydroxyphenyl)propane).

The aforementioned aromatic compounds which have an average of at least two trialkylsilyloxymethyl groups and/or aryldialkylsilyloxymethyl groups bonded to identical or different aryl groups, especially to phenyl rings, can be copolymerized with one another. In this case, the compounds selected would be those which differ in the parent aromatic. Preference is given to copolymerizing the aromatic compounds which have an average of at least two trialkylsilyloxymethyl groups and/or aryldialkylsilyloxymethyl groups bonded to identical or different aryl groups, especially to phenyl rings, together with the monomers of the formula II, IIa or II' or II'a or with the compounds of the formulae IV or V or Va.

The polymerization conditions in the process according to the invention are selected such that the monomer units A and B polymerize synchronously in the course of polymerization of the monomers M. The term "synchronously" does not necessarily mean that the polymerization of the first and second monomer units proceeds at the same rate. Instead, "synchronously" means that the polymerization of the first and second monomer units is coupled kinetically and is triggered by the same polymerization conditions.

The copolymerization of the monomers M, especially of the monomers of the above-defined general formulae I, II, IIa, III, IIIa, IV, V, Va, VI and VIa can be effected in analogy to the methods described in the prior art, and is especially performed with protic catalysis or in the presence of aprotic Lewis acids. Preferred catalysts here are Brønsted acids, for example organic carboxylic acids, for example trifluoroacetic acid or lactic acid, or else organic sulfonic acids such as methanesulfonic acid, trifluoromethanesulfonic acid or toluenesulfonic acid. Likewise suitable are inorganic Brønsted acids such as HCl, $H_2SO_4$ or $HClO_4$. The Lewis acid used may, for example, be $BF_3$, $BCl_3$, $SnCl_4$, $TiCl_4$, or $AlCl_3$ The use of Lewis acids bound in complex form or dissolved in ionic liquids is also possible. The acid is typically used in an amount of 0.1 to 10% by weight, preferably 0.5 to 5%, based on the monomer.

The polymerization can be performed in bulk or preferably in an inert diluent. Suitable diluents are, for example, halogenated hydrocarbons such as dichloromethane, trichloromethane, dichloroethene, or hydrocarbons such as toluene, xylene or hexane, and mixtures thereof.

Preferably, the polymerization of the monomers of the formula I is in substantial absence of water, i.e. the concentration of water at the start of the polymerization is less than 0.1% by weight. Accordingly, preferred monomers of the formula I are those monomers which do not eliminate water under polymerization conditions. These include especially the monomers of the formulae II, IIa, III and IIIa.

The polymerization temperature is typically in the range from 0 to 150° C., especially in the range from 20 to 100° C.

The copolymerization of the monomers M may be followed by purification steps and optionally drying steps.

The copolymerization of the monomers M may be followed by a calcination. In the course of this, the organic polymeric material formed in the polymerization of the monomer unit(s) B is carbonized to form the carbon phase.

The copolymerization of the monomers M may be followed by an oxidative removal of the organic polymer phase. In the course of this, the organic polymeric material formed in the course of copolymerization of the monomer unit(s) B is oxidized to obtain a nanoporous oxidic or nitridic material.

The nanocomposite material obtainable by the process according to the invention has at least one inorganic or organometallic polymer phase which results from the polymerization of the monomer unit A, and at least one organic polymer phase which results from the polymerization of the monomer unit A. The dimensions of the phase domains in the composite material thus obtained are in the region of a few nanometers. In addition, the phase domains of the inorganic or organometallic phase and the phase domains of the organic phase have a co-continuous arrangement, i.e. both the organic phase and the inorganic or organometallic phase penetrate one another and essentially do not form any discontinuous regions. The distances between adjacent phase interfaces or the distances between the domains of adjacent identical phases are extremely small and are on average not more than 10 nm, preferably not more than 5 nm and especially not more than 2 nm. There is no macroscopically visible separation in discontinuous domains of the particular phase.

The distance between adjacent identical phases is understood to mean, for example, the distance between two domains of the inorganic or organometallic phase which are separated from one another by a domain of the organic polymer phase, or the distance between two domains of the organic polymer phase which are separated from one another by a domain of the inorganic or organometallic phase. The mean distance between the domains of adjacent identical phases can be determined by means of combined small-angle X-ray scattering (SAXS) via the scattering vector q (measurement in transmission at 20° C., monochromatized $CuK_\alpha$ radiation, 2D detector (image plate), slit collimation).

With regard to the terms "continuous phase domains", "discontinuous phase domains" and "co-continuous phase domains", reference is also made to W. J. Work et al. Definitions of Terms Related to Polymer Blends, Composites and Multiphase Polymeric Materials, (IUPAC Recommendations 2004), Pure Appl. Chem., 76 (2004), p. 1985-2007, especially p. 2003. According to this, a co-continuous arrangement of a two-component mixture is understood to mean a phase-separated arrangement of the two phases, in which within one domain of each phase all the regions of the phase domain boundary can be connected to one another by a continuous path, without the path crossing any phase boundary.

In the inventive nanocomposite materials, the regions in which the organic phase and the inorganic or organometallic phase form essentially co-continuous phase domains makeup at least 80% by volume, especially 90% by volume, of the nanocomposite materials, as can be determined by combined use of TEM and SAXS.

The inventive nanocomposite materials can be converted to nanoporous inorganic materials in a manner known per se, by oxidatively removing the organic constituents of the inventive nanocomposite material. In the course of this, the nanostructure of the inorganic phase obtained in the inventive nanocomposite material is preserved, and this results, depending on the monomers selected, in a nitride or oxide of the (semi) metal M or in a mixed form. The oxidation is effected typically by calcination in an oxygenous atmosphere, as described in the article by Spange et al. cited at the outset. Such materials are novel and likewise form part of the subject matter of the present invention. In general, the calcination is performed with ingress of oxygen at a temperature in the range from 400 to 1500° C., especially in the range from 500 to 1000° C. The calcination is effected typically in an oxygenous atmosphere, for example in air or other oxygen/nitrogen mixtures, where the proportion by volume of oxygen can be varied over wide ranges and is, for example, in the range from 5 to 50% by volume.

The inventive nanocomposite materials can also be converted to an electrically active nanocomposite material which, as well as an inorganic phase of a (semi)metal oxide or nitride of the (semi)metal M, has a carbon phase C. Such materials are obtainable by calcining the nanocomposite material obtainable in accordance with the invention under substantial or complete exclusion of oxygen. Accordingly, the present invention relates to a carbon-containing nanocomposite material which a) a carbon phase C;

b) and at least one inorganic phase of a (semi)metal oxide or nitride of the (semi)metal M;

which is obtainable by calcining the inventive nanocomposite material obtained by copolymerization under substantial or complete exclusion of oxygen.

In the carbon-containing nanocomposite material, the carbon phase C and the inorganic phase form essentially co-continuous phase domains, the mean distance between two adjacent domains of identical phases generally being not more than 10 nm.

In general, the calcination is performed at a temperature in the range from 400 to 1500° C., especially in the range from 500 to 1000° C.

The calcination is then effected typically under substantial exclusion of oxygen. In other words, the partial oxygen pressure in the reaction zone in which the calcination is performed is low during the calcination and will preferably not exceed 20 mbar, especially 10 mbar. The calcination is preferably performed in an inert gas atmosphere, for example under nitrogen or argon. The inert gas atmosphere will preferably comprise less than 1% by volume, especially less than 0.1% by volume, of oxygen. In a likewise preferred embodiment of the invention, the calcination is performed under reducing conditions, for example in an atmosphere which comprises hydrogen ($H_2$), hydrocarbon gases such as methane, ethane or propane, or ammonia ($NH_3$), optionally as a mixture with an inert such as nitrogen or argon.

To remove volatile constituents, the calcination can be performed in an inert gas stream or in a gas stream which comprises reducing gases such as hydrogen, hydrocarbon gases or ammonia.

The examples and figures which follow serve to illustrate the invention.

I) Analysis

The samples obtained in the copolymerization were analyzed by means of TEM: the TEM analyses were performed as HAADF-STEM with a Tecnai F20 transmission electron microscope (FEI, Eindhoven, the Netherlands) at a working voltage of 200 kV using the ultrathin layer technique (embedding of the samples into synthetic resin as a matrix).

FIG. 1: HAADF-STEM analysis of the sample from example 7 with a magnification of $10^6$.

Figure 2:
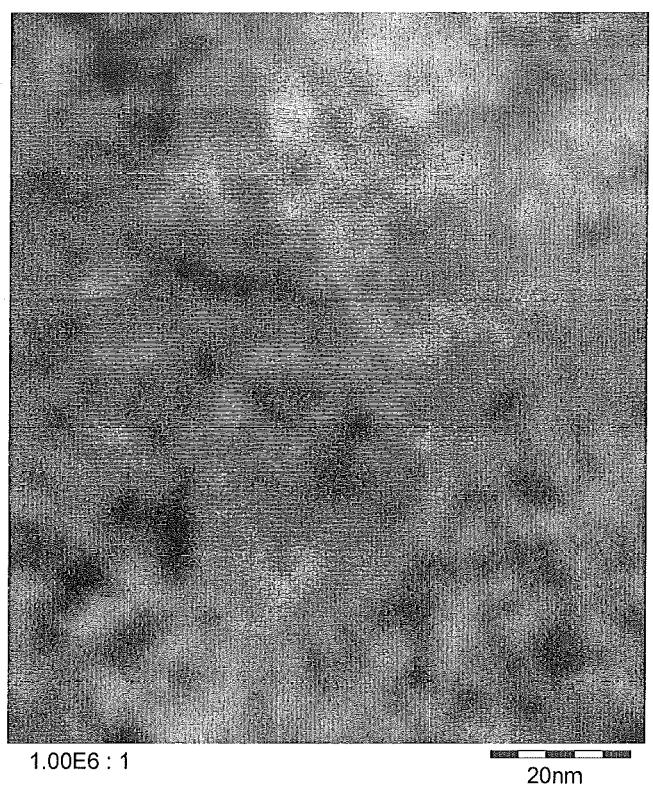

FIG. 2: HAADF-STEM analysis of the sample from example 24 with a magnification of $10^6$.

Figure 3:
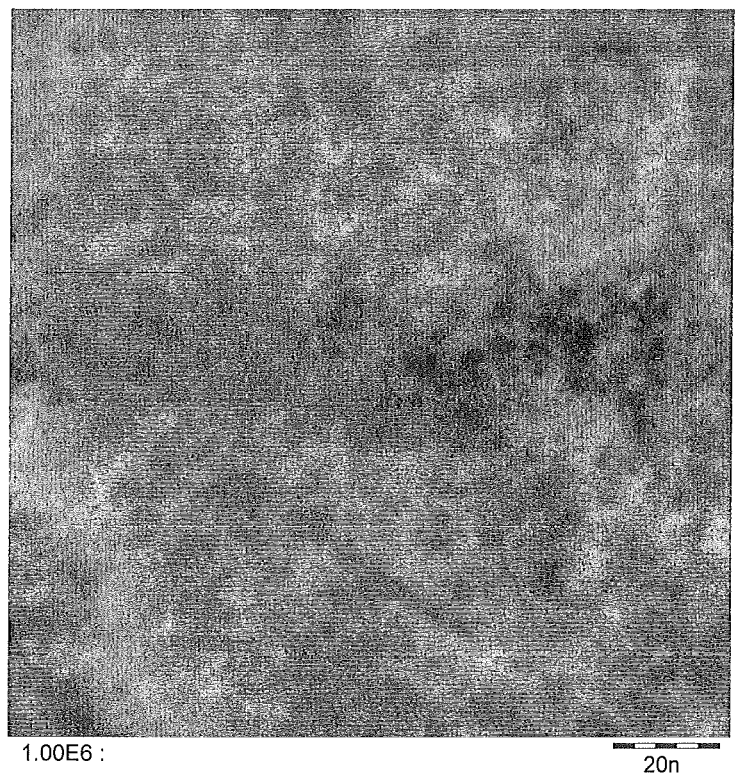

FIG. 3: HAADF-STEM analysis of the sample from example 26 with a magnification of $10^6$.

II) Monomers Used

The following monomers were used:

monomer A: 2,2'-spirobi[4H-1,3,2-benzodioxasilin]: preparation example 1;
monomer B: 2,2-dimethyl[4H-1,3,2-benzodioxasilin]: Tetrahedron Lett. 24 (1983) 1273;
monomer C: 2,2-dimethyl[4-oxo-1,3,2-benzodioxasilin]: Chem. Ber. 96, 1561;
monomer D: 2-methyl-2-vinyl[4-oxo-1,3,2-benzodioxazasilin]: preparation example 2;
monomer E: 2,2-diphenyl[4H-1,3,2-benzodioxasilin]: J. Organomet. Chem. 71 (1974) 225;
monomer F: 2,2-di n-butyl[4H-1,3,2-benzodioxastannin]: Bull. Soc. Chim. Belg. 97 (1988) 873;
monomer G: 2,2-dimethyl[4-methylidene-1,3,2-benzodioxasilin]: J. Organomet. Chem., 244, C5-C8 (1983);
monomer H: bis(4H-1,3,2-benzodioxaborin-2-yl)oxide: Bull. Chem. Soc. Jap. 51 (1978) 524
monomer I: 2,2-spirobi[4H-1,3,2-benzodioxaborin]: Bull. Chem. Soc. Jap. 51 (1978) 524;
monomer K: 2,2-bis[4-trimethylsilyloxy-3,5-bis(trimethylsilyloxymethyl)phenyl]propane (preparation example 3);
monomer L: bis(trimethylsilyloxymethyl)(trimethylsilyloxy)benzene (preparation example 4);
monomer M: 2,2'-spirobi[6H-1,3,2-dioxasilin] Makrom. Chem. 11 (1953) 51;
monomer N: tetrafurfuryloxysilane: Angew. Chem. Int. Ed., 46 (2007) 628;
monomer O: difurfuryloxydimethylsilane: Angew. Chem. Int. Ed., 46 (2007) 628;
monomer P: tetrafurfuryl orthotitanate: Adv. Mater. 2008, 20, 4113; (the compound tetramerizes to (µ4-oxido)-hexakis (m-furfuryloxo)-octakis(furfuryloxo)tetratitanium, which is used as monomer P.)
monomer Q: trifurfuryloxyborane (preparation example 5)

III) PREPARATION EXAMPLES

Preparation Example 1

2,2'-spirobis[4H-1,3,2-benzodioxasilin] (monomer A)

135.77 g of salicyl alcohol (1.0937 mol) were dissolved in toluene at 85° C. Subsequently, 83.24 g (0.5469 mol) of tetramethoxysilane (TMOS) were slowly added dropwise, and, after addition of one third of TMOS, 0.3 ml of tetra-n-butylammonium fluoride (1 M in THF) was introduced with a syringe all at once. The mixture was stirred at 85° C. for 1 h and then the methanol/toluene azeotrope was distilled off (63.7° C.). The remaining toluene was removed on a rotary evaporator. The product was removed from the resulting reaction mixture with hexane at ≈70° C. After cooling to 20° C., the clear solution was decanted off. After removing the hexane, the title compound remained as a white solid. The product can be purified further to remove impurities by reprecipitation with hexane.

$^1$H NMR 400 MHz, CDCl$_3$, 25° C., TMS) δ [ppm]=5.21 (m, 4H, CH$_2$), 6.97-7.05 (m, 6H), 7.21-7.27 (M, 2H).
$^{13}$C NMR (100 MHz, CDCl$_3$, 25° C.): δ [ppm]=66.3 (CH$_2$), 119.3, 122.3, 125.2, 125.7, 129.1, 152.4.
$^{29}$Si CP-MAS (79.5 MHz): δ [ppm]=−78.4

Preparation Example 2

2-methyl-2-vinyl[4-oxo-1,3,2-benzodioxazasilin] (monomer D)

The preparation was effected in analogy to the method specified in the preparation example for the preparation of monomer A, except using dimethoxymethylvinylsilane instead of tetramethoxysilane. This gave a clear oily liquid:

$^1$H-NMR 400 MHz, CDCl$_3$, 25° C., TMS) δ [ppm]=0.37 (s, 3H, CH$_3$), 4.92 (m, 2H, CH$_2$), 5.96-6.15 (m, 3H, —CH=CH$_2$), 6.97-7.05 (m, 3H), 7.21-7.27 (M, 1H).

Preparation Example 3

2,2-bis[4-trimethylsilyloxy-3,5-bis(trimethylsilyloxymethyl)-phenyl]propane (monomer K)

a) 2,2-bis[4-hydroxy-3,5-di(hydroxymethyl)phenyl)]propane 114.4 of bisphenol A (2,2-bis[4-hydroxyphenyl)]propane) were initially charged in a mixture of 450 g of water and 50 g of NaOH. While cooling (Tmax=25° C.), 350 g of 30% formaldehyde solution were added dropwise. After continued reaction at room temperature for 1 h, a clear solution was obtained. The mixture was neutralized by adding solid CO$_2$. The resulting solution was saturated with sodium chloride and extracted 3 times with butanol. The extracts were concentrated on a rotary evaporator at 50° C. down to 5 mbar. This gave a colorless oil which was used in the next step without further purification.

$^1$H-NMR 400 MHz, CDCl$_3$, 25° C., TMS δ [ppm]=7.03 (s, 4 H, aromatic); 5.00 (s, 6 H, —OH (broad)); 4.63 (s, 8H, —CH$_2$—); 1.60 (s, 6 H, C—CH$_3$);

b) 2,2-Bis[4-trimethylsilyloxy-3,5-bis(trimethylsilyloxymethyl)phenyl]propane 95 g of 2,2-bis[4-hydroxy-3,5-di(hydroxymethyl)phenyl)] propane and 160.9 g of N-methylimidazole were initially charged in 400 ml of toluene. While stirring and cooling (approx. 25-30° C.), 213.3 g of trimethylchlorosilane were introduced within 2 h. After the reaction had abated, the mixture was heated to 90° C. for 70 min. After cooling, insolubles were removed from the reaction mixture, which was concentrated. This gave 154 g of a light-colored oil which crystallized.

$^1$H-NMR 400 MHz, CDCl$_3$, 25° C., TMS δ [ppm]=7.15 (s, 4H, aromatic); 4.63 (s, 8H, —CH$_2$—); 1.66 (s, 6 H, C—CH$_3$); 0.24 (s, 18H, —O—Si(CH$_3$)$_3$); 0.08 (s, 36H, —O—Si(CH$_3$)$_3$)

Preparation Example 4 bis(trimethylsilyloxymethyl)(trimethylsilyloxy)benzene (monomer L)

a) Bis(hydroxymethylated)phenol 28 g of NaOH were dissolved in 180 ml of water, and 58.2 g of phenol were added. While stirring and cooling with an ice bath, 180 g of formaldehyde solution (30% in water) were introduced within 2 h. The mixture was neutralized with solid CO$_2$.

The solution obtained was saturated with sodium chloride and extracted 3 times with butanol. The extracts were concentrated on a rotary evaporator at 50° C. down to 5 mbar. In this way, bis(hydroxymethylated)phenol was obtained as a colorless oil.

$^1$H-NMR 400 MHz, CDCl$_3$, 25° C., TMS δ [ppm]=6.6-7.2 (ss, 2.7 H, aromatic); 4.98 (s, 6 H, —OH (broad!)); 4.4-4.7 (ss, 4.5 H, —CH$_2$—);

This corresponds to a degree of substitution of 2.3 HO—CH$_2$— groups/aromatic.

b) Bis(trimethylsilyloxymethyl)(trimethylsilyloxy)benzene (trimethylsilicate of the hydroxymethylated phenol)

41 g of hydroxymethylated phenol and 68 g of N-methylimidazole were initially charged in 200 ml of toluene. While stirring and cooling (approx. 25-30° C.), 90 g of trimethylchlorosilane were introduced within 2 h. After cooling, insolubles were removed from the reaction mixture, which was concentrated. This gave a light-colored oil.

$^1$H-NMR 400 MHz, CDCl$_3$, 25° C., TMS δ [ppm]=7.4-6.7 (ss, 2.7 H, aromatic); 4.5-4.9 (ss, 4.5 H, —CH$_2$—); 0.2-0.3 (ss, 9H, —O—Si(CH$_3$)$_3$); 0.07-0.19 (ss, 20 H, —O—Si(CH$_3$)$_3$)

Preparation Example 5

Trifurfuryloxyborane (monomer Q)

50 ml (0.58 mol) of furfuryl alcohol were initially charged together with 21.4 ml (0.192 mol) of trimethylborate in a 250 ml flask which was equipped with magnetic stirrer, reflux condenser, distillation system, spider and receiver. 0.5 g of KOH was added thereto. The reaction mixture was stirred at 25° C. for 2 h, then the temperature was increased gradually to oil bath temperature 100° C. and the methanol formed was distilled off. The pressure was lowered stepwise to 5 mbar and all by-products were distilled off. The solution was transferred to a Kugelrohr distillation apparatus and the product was finally obtained at 198° C. and 0.4 mbar.

Yield: 28 ml (55%).

$^1$H-NMR (CDCl$_3$): δ=7.42 (3H, dd); 6.33 (3H, dd); 6.26 (3H, dd); 4.83 ppm (6H, s);

IV) COPOLYMERIZATION EXAMPLES

Examples 1-10

Copolymerization in Substance

General method: hydrophobized 20 ml penicillin bottles were charged with 3.5 g of monomer mixture and 0.035 g of trifluoroacetic acid, dissolved in 0.175 g of toluene. Then the mixture was homogenized, and the bottle was closed with a resin cap and introduced into a heating cabinet heated to 85° C. for the polymerization time. The composition of the monomer mixture and the polymerization time, and also the visual appearance of the polymerization product, are specified in Table 1.

TABLE 1

| # | Monomers used | Molar ratio | Reaction time | Appearance of the sample |
|---|---|---|---|---|
| 1 | A + B | B/A = 4/1 | 12 h | transparent solid, light-colored |
| 2 | A + B | B/A = 2/1 | 10 h | transparent solid, pale yellow |
| 3 | A + B | B/A = 1/1 | 6 h | transparent solid, yellow |
| 4 | A + B | B/A = 1/2 | 6 h | transparent solid, yellow-brown |
| 5 | A + B | B/A = 1/4 | 6 h | red-brown solid |
| 6 | A + F | A/F = 57/43 | 1 h | yellow, clear |
| 7 | A + F | A/F = 39/61 | 1 h | yellow, clear |

TABLE 1-continued

| # | Monomers used | Molar ratio | Reaction time | Appearance of the sample |
|---|---|---|---|---|
| 8 | A + F | A/F = 25/75 | 5 d | pale yellow, turbid/milky |
| 9 | A + F | A/F = 72/28 | 1 h | yellow |
| 10 | A + F | A/F = 84/16 | 1 h | brown |

The solids obtained in examples 6 to 10 were analyzed by means of TEM and each exhibited a nanodisperse distribution of inorganic and organic phases with a mutually penetrating phase structure. The distances between adjacent domains are well below 5 nm.

Examples 11 to 22

Copolymerization in Substance

In an analogous manner to general method I, mixtures of 4 g of monomer A and 1 g of comonomer were copolymerized at 85° C. for 16 h. The comonomers and the visual appearance of the polymerization product are specified in Table 2.

TABLE 2

| # | Comonomer | Appearance of the sample |
|---|---|---|
| 11 | C | clear resin, pale brown |
| 12 | D | clear resin, pale yellow |
| 13 | E | clear resin, light-colored |
| 14 | G | clear resin, pale brown |
| 15 | H | clear resin, light-colored |
| 16 | I | clear resin, light-colored |
| 17 | K | clear resin, pale yellow |
| 18 | L | clear resin, orange |
| 19 | N | dark-colored resin |
| 20 | O | dark-colored resin |
| 21 | P | dark-colored resin |
| 22 | Q | dark-colored resin |

Examples 23 and 24

Copolymerization in Substance with Dimethoxymethane as a Conventional Comonomer

In an analogous manner to general method I, mixtures of monomer A and monomer B were copolymerized at 85° C. for 16 h with addition of 0.08 g of dimethoxymethane as a conventional comonomer and 0.02 g of trifluoroacetic acid as a catalyst. The amounts of the comonomers are reported in Table 3. In both cases, solids were obtained.

The solids obtained in examples 23 and 24 were analyzed by means of TEM and each exhibited a nanodisperse distribution of inorganic and organic phases with a mutually penetrating phase structure. The distances between adjacent domains are well below 5 nm.

TABLE 3

| # | Monomer A [g] | Monomer B [g] |
|---|---|---|
| 23 | 0.4 | 1.6 |
| 24 | 1.0 | 1.0 |

Examples 25 and 26

Copolymerization in Substance with Lactic Acid as a Catalyst

General method: hydrophobized 20 ml penicillin bottles were charged with 3.5 g of monomer mixture and melted at 90° C. in a drying cabinet. 50 mg of lactic acid were added thereto. The bottle was closed with a sealing cap and introduced into a heating cabinet heated to 90° C. for 16 h. The composition of the monomer mixture is reported in Table 4. In both cases, solids were obtained.

The solids obtained in examples 25 and 26 were analyzed by means of TEM and each exhibited a nanodisperse distribution of inorganic and organic phases with a mutually penetrating phase structure. The distances between adjacent domains are well below 5 nm.

TABLE 4

| # | Monomer A [g] | Monomer L [g] |
|---|---|---|
| 25 | 3.325 | 0.175 |
| 26 | 3.15 | 0.35 |

Examples 27 to 30

Precipitation Copolymerization from Solvent

General experimental method: 5 g of the monomer mixture were dissolved in 50 ml of toluene. The polymerization was initiated by adding 5% by weight of trifluorosulfonicanhydride (as a 1 M solution in toluene) at 23° C. Immediately after addition of the initiator, a color change from pale yellow to brown was evident, combined with significant evolution of heat. Gelation set in after no later than 15 minutes. The reaction mixture was filtered at 23° C. after 10 to 14 hours, and the solids were dried to constant mass under reduced pressure at 40° C. Dark brown to black/greenish powders were obtained in high (almost quantitative) yield. The monomer mixtures used are specified in Table 5.

TABLE 5

| monomer mixture used: | | | | |
|---|---|---|---|---|
| | Ex. 27 | Ex. 28 | Ex. 29 | Ex. 30 |
| Monomer N [% by wt.] | 95 | 87 | 84 | 55 |
| Monomer P [% by wt.] | 5 | 13 | 16 | 45 |

V) Thermolysis of the Hybrid Materials by Heat Treatment with Ingress of Oxygen

Examples 31 to 34

Heat Treatment of the Hybrid Materials within Ingress of Oxygen

The hybrid materials obtained in examples 27 to 30 were heat treated at 600° C. (heating rate: 4 K/min, air atmosphere) for 10 hours. White materials were obtained, which comprise less than 0.8% carbon (elemental analysis). Titanium contents and BET surface areas (determined by $N_2$ physisorption to DIN 66131) are reported in Table 6.

TABLE 6

| | Ex. 31 | Ex. 32 | Ex. 33 | Ex. 34 |
|---|---|---|---|---|
| Starting material | Ex. 27 | Ex. 28 | Ex. 29 | Ex. 30 |
| % Ti theory | 3.7 | 10.6 | 13.0 | 35.7 |
| % Ti found | 2.3 | 9.5 | 19.4 | 31.1 |
| BET surface area [m$^2$/g] | 657 | 622 | 502 | 569 |

The invention claimed is:

1. A process for producing a nanocomposite material comprising
   a) at least one inorganic or organometallic metal phase; and
   b) an organic polymer phase;
   the process comprising polymerizing at least one monomer which comprises
      at least one first polymerizable monomer unit A which has a metal or semimetal M, and
      at least one second polymerizable organic monomer unit B which is joined to the polymerizable unit A via a covalent chemical bond,
   under polymerization conditions under which both the polymerizable monomer unit A and the polymerizable unit B polymerize with breakage of the bond between A and B;
   the monomers to be polymerized comprising:
   a first monomer M1 and at least one second monomer M2 which each comprise at least one first polymerizable monomer unit A and at least one second polymerizable organic monomer unit B, which differ at least in one of the monomer units A and B, or
   the monomers to be polymerized comprising, as well as the at least one monomer to be polymerized comprising at least one first polymerizable monomer unit A and at least one second polymerizable organic monomer unit B, at least one further, different monomer which does not have a monomer unit A and is copolymerizable with the monomer unit B.

2. The process according to claim 1, wherein the metal or semimetal is selected from the group consisting of B, Al, Si, Ti, Zr, Hf, Ge, Sn, Pb, V, As, Sb, Bi, and mixtures thereof.

3. The process according to claim 1, wherein the metal or semimetal M comprises silicon to an extent of at least 90 mol %, based on the total amount of M.

4. The process according to claim 1, wherein the monomers to be polymerized, which have at least one monomer unit A and at least one monomer unit B, comprise a first monomer M1 and at least one second monomer M2 which differs from the monomer M1 at least in one of the monomer units A and B, and the molar ratio of the monomers M1 and M2 relative to one another is in the range from 5:95 to 95:5.

5. The process according to claim 1, wherein the monomers to be polymerized, which have at least one monomer unit A and at least one monomer unit B, comprise a first monomer M1 and at least one second monomer M2 which differs from the monomer M1 at least in the monomer unit A.

6. The process according to claim 1, wherein the monomers which have at least one monomer unit A and at least one monomer unit B are described by the general formula I:

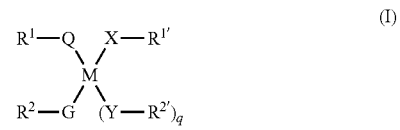

(I)

in which

M is a metal or semimetal;

$R^1$, $R^2$ may be the same or different and are each an Ar—C($R^a$,$R^b$)—radical in which Ar is an aromatic or heteroaromatic ring which optionally has 1 or 2 substituents selected from halogen, CN, $C_1$-$C_6$-alkyl, $C_1$-$C_6$-alkoxy and phenyl, and $R^a$, $R^b$ are each independently hydrogen or methyl or together are an oxygen atom or a methylidene group (=$CH_2$), or the $R^1Q$ and $R^2G$ radicals together are a radical of the formula A

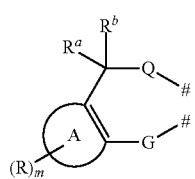

(A)

in which A is an aromatic or heteroaromatic ring fused to the double bond, m is 0, 1 or 2, the R radicals may be the same or different and are selected from halogen, CN, $C_1$-$C_6$-alkyl, $C_1$-$C_6$-alkoxy and phenyl, and $R^a$, $R^b$ are each as defined above;

G is O, S or NH;

Q is O, S or NH;

q according to the valency and charge of M is 0, 1 or 2;

X, Y may be the same or different and are each O, S, NH or a chemical bond;

$R^{1'}$, $R^{2'}$ may be the same or different and are each $C_1$-$C_6$-alkyl, $C_3$-$C_6$-cycloalkyl, aryl or an Ar'—C($R^{a'}$,$R^{b'}$)—radical in which Ar' is as defined for Ar and $R^{a'}$, $R^{b'}$ are each as defined for $R^a$, $R^b$, or $R^{1'}$, $R^{2'}$ together with X and Y are a radical of the formula A, as defined above, or, when X is oxygen, the $R^{1'}$ radical may be a radical of the formula:

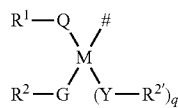

in which q, $R^1$, $R^2$, $R^{2'}$, Y, Q and G are each as defined above and # means the bond to X.

7. The process according to claim 5, wherein the monomers to be polymerized, which have at least one monomer unit A and at least one monomer unit B, comprise at least one monomer of the general formula II:

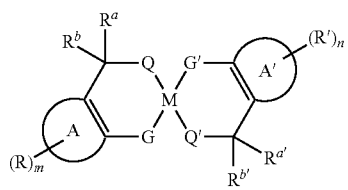

(II)

in which

M is a metal or semimetal;

A and A' are each an aromatic or heteroaromatic ring fused to the double bond;

m and n are each independently 0, 1 or 2;

G and G' are the same or different and are each independently O, S or NH;

Q and Q' are the same or different and are each independently O, S or NH;

R and R' are the same or different and are each independently selected from halogen, CN, $C_1$-$C_6$-alkyl, $C_1$-$C_6$-alkoxy and phenyl; and $R^a$, $R^b$, $R^{a'}$ and $R^{b'}$, are each independently selected from hydrogen and methyl, or $R^a$ and $R^b$ and/or $R^{a'}$ and $R^{b'}$ in each case together are an oxygen atom.

8. The process according to claim 7, wherein the monomers to be polymerized, which have at least one monomer unit A and at least one monomer unit B, comprise a first monomer M1 and at least one second monomer M2 which differs at least in the monomer unit A from the monomer M1, the monomer M1 being selected from the monomers of the formula II.

9. The process according to claim 7, wherein the monomers to be polymerized, which have at least one monomer unit A and at least one monomer unit B, comprise a first monomer M1 and at least one second monomer M2 which differs in at least one of the monomer units A from the monomer M1, the monomer M1 being selected from the monomers of the formula II and the at least one further monomer M2 being selected from the monomers of the formula III:

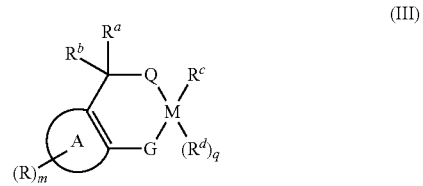

(III)

in which

M is a metal or semimetal;

A is an aromatic or heteroaromatic ring fused to the double bond;

m is 0, 1 or 2;

q according to the valency and charge of M is 0, 1 or 2;

G is O, S or NH;

Q is O, S or NH;

R are selected independently from halogen, CN, $C_1$-$C_6$-alkoxy, $C_1$-$C_6$alkoxy and phenyl;

$R^a$, $R^b$ are each independently selected from hydrogen and methyl, or $R^a$ and $R^b$ together are an oxygen atom or a methylidene group, and $R^c$, $R^d$ are the same or different and are each selected from $C_1$-$C_6$-alkyl, $C_3$-$C_6$-cycloalkyl and aryl.

10. The process according to claim 7, wherein the monomers to be polymerized, which have at least one monomer unit A and at least one monomer unit B, comprise a first monomer M1 and at least one second monomer M2 which differs from the monomer M1 at least in one of the monomer units A, the monomer M1 being selected from the monomers of the foimula II, and the at least one further monomer M2 being selected from aromatic compounds which have at least two trialkylsilyloxymethyl groups and/or aryldialkylsilyloxymethyl groups bonded to the same or different phenyl rings.

11. The process according to claim 7, wherein the monomers to be polymerized, which have at least one monomer unit A and at least one monomer unit B, comprise a first monomer M1 and at least one second monomer M2 which differs in the monomer units B and optionally A from the monomer M1, the monomer M1 being selected from the monomers of the formula II and the at least one further monomer M2 being selected from the monomers of the formula IV:

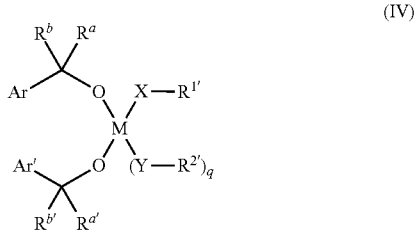

in which:

M is a metal or semimetal;

Ar, Ar' are the same or different and are each an aromatic or heteroaromatic ring which optionally has 1 or 2 substituents selected from halogen, CN, $C_1$-$C_6$-alkyl, $C_1C_6$-alkoxy and phenyl;

$R^a$, $R^b$, $R^{a'}$, $R^{b'}$ are each independently selected from hydrogen and methyl, $R^a$, or $R^b$ and/or $R^{a'}$ and $R^{b'}$ in each case together are an oxygen atom;

q according to the valency of M is 0, 1 or 2;

X, Y may be the same or different and are each O, S, NH or a chemical bond; and $R^{1'}$, $R^{2'}$ may be the same or different and are each $C_1$-$C_6$-alkyl, $C_3$-$C_6$-cycloalkyl, aryl or an Ar''—C($R^{a''}$,$R^{b''}$)— radical in which Ar' is as defined for Ar and $R^{a''}$, $R^{b''}$ are each as defined for $R^a$, $R^b$, or $R^{1'}$, $R^{2'}$ together with X and Y are a radical of the formula A as defined above.

12. The process according to claim 6, wherein the monomers to be polymerized, which have at least one monomer unit A and at least one monomer unit B, comprise at least one monomer of the general formula IV as defined in claim 11.

13. The process according to claim 11, wherein the monomers to be polymerized, which have at least one monomer unit A and at least one monomer unit B, comprise at least one monomer of the general formula V:

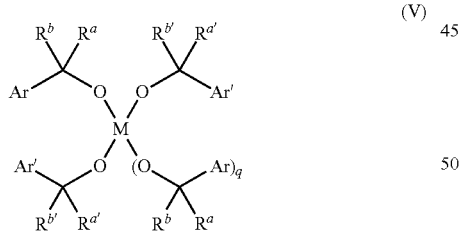

in which

M is a metal or semimetal;

Ar, Ar' are the same or different and are each an aromatic or heteroaromatic ring which optionally has 1 or 2 substituents selected from halogen, CN, $C_1$-$C_6$-alkyl, $C_1$-$C_6$-alkoxy and phenyl;

$R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom; and q according to the valency of M is 0, 1 or 2.

14. The process according to claim 13, wherein the monomers to be polymerized, which have at least one monomer unit A and at least one monomer unit B, comprise a first monomer M1 and at least one second monomer M2 which differs at least in the monomer unit A from the monomer M1, the monomer M1 being selected from the monomers of the formula V and the at least one further monomer M2 being selected from the monomers of the formula V which differ in the (semi)metal M from the monomer M1.

15. The process according to claim 13, wherein the monomers to be polymerized, which have at least one monomer unit A and at least one monomer unit B, comprise a first monomer M1 and at least one second monomer M2 which differs in the monomer units A and B from the monomer M1, the monomer M1 being selected from the monomers of the formula V and the at least one further monomer M2 being selected from the monomers of the formula III as defined in claim 9.

16. The process according to claim 13, wherein the monomers to be polymerized, which have at least one monomer unit A and at least one monomer unit B, comprise a first monomer M1 and at least one second monomer M2 which differs at least in the monomer unit A from the monomer M1, the monomer M1 being selected from the monomers of the formula V and the at least one further monomer M2 being selected from the monomers of the formula VI:

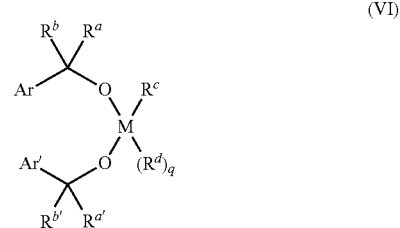

in which

M is a metal or semimetal;

Ar, Ar' are the same or different and are each an aromatic or heteroaromatic ring which optionally has 1 or 2 substituents selected from halogen, CN, $C_1$-$C_6$-alkyl, $C_1C_6$-alkoxy and phenyl;

$R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom; and q according to the valency of M is 0, 1 or 2; and $R^c$, $R^d$ are the same or different and are each selected from $C_1$-$C_6$- alkyl, $C_3$-$C_6$-cycloalkyl and aryl.

* * * * *